United States Patent Office 3,321,343
Patented May 23, 1967

3,321,343
PRIMING COMPOSITION CONTAINING CARBON WHICH EXHIBITS CONCHOIDAL FRACTURE
Edward A. Staba, Higganum, Conn., assignor to Olin Mathieson Chemical Corporation, a corporation of Virginia
No Drawing. Filed Mar. 28, 1966, Ser. No. 537,699
7 Claims. (Cl. 149—24)

The present invention relates to priming mixtures for percussion primers, particularly rim fire priming.

Since the inception of the rim fire concept, it has been customary to use ground glass in the priming mixture. The main purpose of the ground glass is to enhance sensitivity to percussion through the abrasive effect of the glass acting on percussion sensitive ingredients in the priming mixture.

Recently, it has been considered desirable to eliminate ground glass as a constituent of rim fire priming. One reason for desiring to eliminate ground glass particles is that the glass particles are present in the priming residues normally deposited in the gun bore. These glass particles contribute to more rapid wear of the gun bore than would occur if the priming residue were free of these abrasive particles. Thus, it is believed that the use of ground glass in priming mixtures shortens the life of the weapon in which ammunition with such priming is used.

In addition, the use of ground glass is further disadvantageous in that it increases the wear rate of tools used in the process of applying the priming mixture to the head and rim area of the shell. This increased rate of tool mortality increases operating costs and is therefore highly objectionable.

When it is attempted to utilize glassless priming mixtures experimentally, especially in the priming of rim fire cartridges, certain other difficulties arise. When one attempts to utilize glassless priming mixtures, it becomes apparent that the glass in the priming mixture performs other functions than enhancing the sensitivity of the priming mixture. For example, the conventional rim fire priming process involves charging a water wet pellet of priming into the empty shell. This pellet is subsequently distributed in the head of the shell and forced into the rim of the shell by means of a spinning punch. The end of the spinning punch is profiled to impart an impelling action on the water wet pellet. The successful application of this process depends greatly on having a priming pellet of proper wetness and fluidity to respond consistently and reliably to the spinning punch.

When ground glass is excluded from rim fire priming, the resulting mixture has an unfavorable texture. The fluidity of the mixture is unduly sensitive to small changes in actual water content. If the fluidity of the mixture is adjusted by judicious application of water in small increments to a proper level for the operation of forming the priming pellet, normal evaporative losses occurring in the interim before the spinning operation, reduce the fluidity of the pellet so that it will not spin properly. If an excess of water is added to the mixture to compensate for this evaporative loss, the mixture becomes excessively fluid. The entire mass of mixture tends to flow or creep on the charging table and the individual ingredients of the mixture tend to separate causing a compositional change.

It appears, therefore, that ground glass has a beneficial effect on the texture of the priming mixture. It imparts a flow resisting effect to a priming mixture that is freely wet so that the undisturbed mixture does not flow or creep, nor do the individual ingredients tend to separate. Thus, ground glass has a stabilizing effect on the fluidity of the priming mixture permitting rather wide latitude in the actual water content of the mixture without appreciable change in the flow characteristics of the mass.

It is possible to eliminate glass from the priming mixtures in order to reduce normal wearing effects caused by the glass since primary explosives having better percussion sensitivity are now available. For example, the use of Stabanate, a proprietary name applied to the double lead salt of styphnic acid and nitroaminotetrazole, described in copending application Ser. No. 185,851, provides a significant sensitivity advantage. However, this cannot be conveniently done due to the fluidity problems that are raised, referred to above.

Accordingly, it is an object of the present invention to provide a satisfactory glassless priming mixture, especially for rim fire priming.

It is a further object of the present invention to provide a glassless priming mixture retaining the advantages of glass containing priming mixtures with regard to enhanced percussion sensitivity.

A further object of the present invention is to provide a priming mixture as above which reduces the highly abrasive effect of glass on the weapon bore and tools used in applying the priming mixture.

A still further object of the present invention is to provide a glassless priming mixture as above which is readily amenable to proper fluidity control in a manner similar to conventional glass containing priming mixtures.

Further objects and advantages of the present invention will appear hereinafter.

In accordance with the present invention it has now been found that the foregoing objects and advantages may be readily achieved.

The priming mixture of the present invention comprises: from 4 to 40% of granulated amorphous carbon which exhibits conchoidal fracture, preferably granulated to pass a 100 mesh screen; from 5 to 60% of oxidizing agent and from 5 to 80% of primary explosive.

In accordance with the present invention it has been found that the foregoing composition surprisingly overcomes the disadvantages noted above and achieves a highly advantageous priming mixture. The amorphous carbon exhibits a similar texturing effect as ground glass while significantly reducing the highly abrasive characteristics of ground glass. In addition, the use of the foregoing priming mixture overcomes the severe fluidity problems noted hereinabove.

In accordance with the present invention the priming composition contains from 4 to 40% of granular amorphous carbon which exhibits conchoidal fracture and which preferably passes a 100 mesh screen. The preferred quantity is from 10 to 25%. Anthracite coal with a high fixed carbon content is preferred and representative of amorphous carbon with exhibits conchoidal fracture. Also applicable are certain petroleum cokes and certain asphaltic materials. By a material which exhibits conchoidal fracture it is meant a material which when shattered forms a jagged particle with shattering occurring so that typically concave areas are developed and in addition very sharp edges.

For use in priming, the materials should be solid, stable, infusible or have high fusion temperature, compatible with other components, insoluble in water or only slightly soluble, and they should not yield objectionable residues, i.e., corrosive, mercuric, fouling, etc. Amorphous carbon fulfills all these requirements and in addition is virtually non-abrasive and inexpensive. As a form of amorphous carbon, anthracite coal which exhibits a conchoidal fracture on being crushed, confers the added advantage of controlling the flow characteristics of the water wet paste. A considerable number of mineral materials, such as certain types of quartz, for example, exhibit a conchoidal fracture tendency, but such materials are abrasive and would possess no advantage over glass for this reason. The present invention resides in amorphous carbon or any substance having a high elemental carbon content, which also exhibits a conchoidal fracture tendency.

In addition, the priming mixture of the present invention contains from 5 to 80% of a primary explosive, preferably from 30 to 60%. Conventionally, a mixture of primary explosives are utilized with different sensitivities. For example, a large amount of lead styphnate and a small amount of guanyl-nitrosamino-guanyl-tetrazene.

In addition, the composition of the present invention uses from 5 to 60% of an oxidizing agent, preferably from 15 to 30% of an oxidizing agent. The oxidizing agent or agents are utilized to sustain the liberation of heat. Conventionally, more than one oxidizing agent is employed, for example, a large amount of barium nitrate and a smaller amount of lead peroxide as a booster oxidizer which liberates oxygen at a lower temperature than barium nitrate. Barium nitrate and lead peroxide are the preferred oxidizing agents for use in priming. Many other oxidizing agents are known may be used, but these are less desirable due to various disadvantages. Examples of these materials include: sodium nitrate; potassium nitrate; lead nitrate; potassium chlorate; potassium perchlorate; potassium permanganate; ammonium nitrate; ammonium perchlorate; barium peroxide; strontium peroxide; lead monoxide; and ferric oxide.

Priming mixtures preferably but not essentially contain small quantities of a binder, for example, from 0.5 to 3% of an adhesive binder, such as gum arabic, karaya gum, gum tragacanth, dextrin and glue. In addition, pigments are normally employed to provide contrast in color between the color of the priming mixture and the color of the brass, for example, from 0.1 to 1% thereof. Typical pigments which are used are Prussian blue, para red, lamp black, etc. It should be noted that anthracite coal provides sufficient color contrast so that pigments are normally not required if 10% or more coal is used. Other inert materials may be employed in the priming mixture, such as metallic soaps and metal powders.

The present invention is preferably utilized in connection with rim fire ammunition. It can also be used advantageously in priming mixtures for center fire cartridges and shotgun shells.

During the formulation of the mixture, as stated hereinabove from 10 to 20% of water is conventionally added during the preparation thereof.

The present invention will be more readily apparent from a consideration of the following illustrative examples.

EXAMPLE I

Rim fire priming formulations were prepared having the following compositions.

TABLE I

| Materials, percent | Mix "A" | Mix "B" | Mix "C" | Mix "D" | Mix "E" | Mix "F" |
|---|---|---|---|---|---|---|
| Lead styphnate | 45.0 | 45.0 | | | | 20.0 |
| Stabanate | | | 35.0 | 30.0 | 30.0 | 25.0 |
| Tetrazene | 3.0 | 3.0 | 3.0 | 3.0 | 3.0 | 3.0 |
| Barium nitrate | 22.0 | 51.0 | 51.0 | 56.0 | 46.0 | 36.25 |
| Ground glass | 22.0 | | | | | |
| Lead peroxide | 7.0 | | | | | |
| Gum arabic | 1.0 | 1.0 | 1.0 | 1.0 | 1.0 | |
| Karaya gum | | | | | | 0.75 |
| Prussian blue | 0.3 | 0.3 | | | | |
| Ground coke | | | 10.0 | | | |
| Ground anthracite coal | | | | 10.0 | 20.0 | 15.00 |

Mix A is an example of a glass bearing lead styphnate mixture. This mixture has satisfactory tolerance to wetting and may be charged to form pellets with ease at a water content ranging from about 13 to 19%. Flow resistance is imparted to the mass by the sharp, jagged particles of glass which impede inter-particle movement. The glass particles become snagged on each other, and on particles of the other ingredients, because of the sharp jagged vertices and edges of the glass particles. When glass is crushed, it fractures in a conchoidal manner, and the preponderance of sharp jagged edges and vertices on the particles produced is the consequence of this system of fracture.

When glass is excluded from the priming, to avoid the effects of abrasion on the gun bore, and on the tools used to prime rim fire cartridge cases, the resultant mixture suffers a marked reduction in tolerance to wetting. The absence of sharp jagged particles results in a marked change in the flow characteristics of the wet priming mass. Thus mix B, which is similar to mix A except that it contains no glass, does not handle well in charging if the water content exceeds about 14.5%. If this percentage is exceeded, the mixture becomes excessively fluid. If the moisture content is below about 12.5%, this mixture lacks sufficient fluidity to permit easy filling of the holes in the charge plate and the weight of the priming pellets varies excessively. Thus for satisfactory operation, mix B must be charged at a water content between 12.5 and 14.5%, and frequent addition of small amounts of water is required to compensate for normal evaporative loss. Such judicious wetting, followed by blending of the mass to incorporate the added water, is a time consuming operation that detracts from the productivity of the operator, and is therefore economically disadvantageous.

Mix C, though differing significantly in composition from mixes A and B in that it contains Stabanate and no lead styphnate, is also subject to the disadvantage cited above since it contains no glass. It is useable through about the same 12.5 to 14.5% range in water content. This mixture contains 10% amorphous powdered carbon derived by grinding coke. Carbon particles derived in this manner have a random irregular shape, but they do not exhibit the conchoidal cleavage tendency, nor do they have sharp, jagged edges and vertices like glass particles. Inclusion of carbon particles of this type does not materially affect the flow characteristics of the mixture.

In contrast, mix D has about the same composition as mix C, except that instead of carbon derived from coke, ground anthracite coal is used. The grade of anthracite coal selected for this purpose is characterized by a high fixed carbon content, and low to moderate ash and volatile matter content; but more importantly, it exhibits a profound tendency to fracture in the conchoidal manner. The particles of crushed coal bear a remarkable similarity to particles of crushed glass with respect to shape of the particles and the sharp jagged edges developed. Analysis of a coal sample that has been used in this application is as follows:

| | Percent |
|---|---|
| Moisture | 2.0 |
| Volatile matter | 5.12 |
| Ash | 5.75 |
| Total fixed carbon | 87.13 |

Although a higher fixed carbon content is considered desirable, the most significant factor is the way the coal fractures and the nature of the particles produced.

Mix D has been found to have a broader range of useable wetness than either mixes B or C, but it does not equal that of the glass bearing mix A. Mix D may be processed easily through a water content range of about 12.5 to 16.0%. If the coal content is increased to 20%, as in mix E, the useable range is extended to about 12.5 to 17% water. Higher coal content confers further benefit in added tolerance to wetting.

A disadvantage that has been noted when a high percentage of either coal or carbon are used in mixtures, such as mix E, is a tendency for the carbon at the surface of a mass being wetted to "float off" the surface of the mixture where the water is applied. It is then necessary to reblend the separated coal to restore homogeneity. This effect is believed to be due to the relatively lower specific gravity of coal compared to the other ingredients of the mix. Such separation also occurs with glass bearing mixtures, wherein the glass tends to separate, but to a lesser degree. Such separation of ingredients when water is is added to the mixture mass may be entirely avoided if karaya gum is used in place of gum arabic as the adhesive. Thus mix F may be wetted freely as required to achieve a suitable degree of wetness without having coal separate as the water is added.

EXAMPLE II

The following example compares the sensitivity of the compositions of the present invention with glass-bearing formulations. In this example the sensitivity indicies were determined using priming formulations of Example I. The sensitivity indicies listed below were based on testing 50 shells at each one inch height increment with a 2 oz. drop weight.

TABLE II

| Sensitivity Indicies | Mix "A" | Mix "B" | Mix "D" | Mix "E" | Mix "F" |
| --- | --- | --- | --- | --- | --- |
| $\overline{H}$ | 4.84 | 6.46 | 4.90 | 4.10 | 5.22 |
| S | 1.17 | 0.72 | 1.22 | 1.22 | 0.75 |
| $\overline{H}+4S$ | 9.52 | 9.34 | 9.78 | 8.98 | 8.22 |
| $\overline{H}-2S$ | 2.50 | 5.02 | 2.46 | 1.66 | 3.72 |
| 50 shells fired at (in.) | 8 | 8 | 7 | 7 | 7 |
| 50 shells misfired at (in.) | 2 | 5 | 2 | 1 | 3 |

The data presented in Table II is the result of so-called "Run-down Tests" conducted on rim fire shells primed with the various priming mixtures listed. In conducting this test, the shells are placed in a steel die which is similar to a gun chamber with the bore in a vertical plane. A firing pin of standard configuration is held in a superimposed fixture, positioned to cause the firing pin to strike the rim area of the shell in a manner similar to that occurring in a gun when a cartridge is fired. A 2 oz. weight is dropped onto the firing pin from a vertical position above the firing pin from a magnetic holding fixture which is adjustable to provide a height of fall ranging from 0" to the maximum height required to fire the various types of primers tested. In conducting the test, 50 shells are subjected to impact the falling weight at heights varying in 1" increments between the extremes at which all 50 units fire and all 50 units misfire. The number of misfires encountered at each of the intermediate 1" increments are counted and this data is used to calaculate the statistical sensitivity indicies presented in Table II.

The $\overline{H}$ value represents the height in inches at which one could expect 50% of the units in any test group to fire. For example, 50% of the units primed with mix B could be expected to fire at 6.46". Obviously, the smaller this figure is, the more sensitive the primed shells are. In preparing the primed shell test samples presented in Table II the same lot of unprimed brass shell cases was used for each sample, and sample preparation was otherwise conducted in a standard manner to minimize processing variables. Thus the only variable being evaluated in the run down tests was the inherent sensitivity of the priming formulation. On the basis of the magnitude of the $\overline{H}$ value, mix E would be judged the most sensitive of the group, whereas mix B would be considered the least sensitive.

The S value represents the standard deviation from the means or average, and it is a measure of the dispersion of the test results (misfires) above and below the $\overline{H}$ value. In a more practical vein, S expresses the uniformity of the units in the test lot with respect to sensitivity. The smaller the S value is, the more uniform the sensitivity, and the smaller the dispersion about the $\overline{H}$ value. Thus the S value is not a quantitative expression of inherent sensitivity, but it reflects unit to unit uniformity with respect to the sensitivity.

The $\overline{H}+4S$ value is the sum of the $\overline{H}$ value added to the product of S (the standard deviation) multiplied by four. At the energy level represented by a 2 oz. weight falling $\overline{H}+4S$ inches, only occasional failure to fire is expected, as for example, one misfire in 10,000 units. Above this level of energy, firing is virtually guaranteed (barring manufacturing aberrations). Thus the $\overline{H}+4S$ value reflects the inherent sensitivity (the $\overline{H}$ value) as well as the dispersion of the sensitivity responses *above* the $\overline{H}$ value. It is a statistical measure of the reliability of an ammunition lot.

The $\overline{H}-2S$ is equal to the $\overline{H}$ value less twice the S value. The energy represented by a 2 oz. weight falling $\overline{H}-2S''$ is the threshold energy level at which occasional firing might result (such as 1 firing out of 100). Application of energy levels below this threshold value are virtually certain to result in misfire. A fairly low $\overline{H}-2S$ value is inevitable if the primed units are sensitive (low $\overline{H}$), but a very low value is undesirable since it infers that accidental firing of the cartridge could occur due to rough handling. Generally, an $\overline{H}-2S$ value above 2.00 is desired for safety reasons.

Analysis of mixture sensitivity in relation to mixture composition

Correlation of the sensitivity values presented in Table II with the chemical composition of these mixtures presented in Table I affords a means of judging the effect of composition on sensitivity. Thus the effect of glass in enhancing sensitivity is evident in comparing mixes A and B since both contain 45% lead styphnate and 3% tetrazene. The effect of Stabanate in enhancing sensitivity, compared to lead styphnate can be judged by comparing mixes A and D which have quite similar sensitivity characteristics although mix D contains no glass. The effect of anthracite coal on sensitivity can be judged by comparing mixes D and E both of which contain 30% Stabanate and 3% tetrazene. Mix E containing 20% anthracite coal is significantly more sensitive than mix D which contains 10% anthracite coal. However, mix E is possibly too sensitive since the $\overline{H}-2S$ value is less than 2.00. Mix F represents a compromise of various opposing factors. It contains both Stabanate and lead styphnate. It is more setnsitive than mix B the all-styphnate glassless mix, but less sensitive than mixes D and E which contain Stabanate only. It contains 15% anthracite coal which is intermediate between the 10% of mix D and the 20% of mix E. The higher $\overline{H}-2S$ value of mix F assures freedom from super sensitivity and the hazard of accidental discharge. Mix F also contains karaya gum instead of gum arabic which prevents separation or "floating out" of carbon as water is added to adjust the wetness of the mixture.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A priming mixture for ammunition comprising: from 4 to 40% by weight granulated amorphous carbon which exhibits conchoidal fracture; from 5 to 60% by weight of an oxidizing agent which liberates oxygen selected from the group consisting of inorganic salts and metal oxides; and from 5 to 80% by weight of a percussion sensitive, solid, substantially insoluble primary explosive.

2. A priming mixture according to claim 1 wherein said amorphous carbon is granulated to pass a 100 mesh screen.

3. A priming composition according to claim 1 wherein said amorphous carbon is anthracite coal.

4. A priming mixture according to claim 1 wherein said oxidizing agent is barium nitrate and lead peroxide.

5. A priming mixture according to claim 1 containing from 0.5 to 3.0 percent of a binder.

6. A priming mixture for ammunition comprising: from 10 to 25% by weight of a granular anthracite coal which exhibits conchoidal fracture granulated to pass a 100 mesh screen; from 15 to 30% by weight of an oxidizing agent which liberates oxygen selected from the group consisting of inorganic salts and metal oxides; and from 30 to 60% by weight of a percussion sensitive, solid, substantially insoluble primary explosive.

7. A priming mixture according to claim 6 containing from 0.5 to 3.0 percent of a binder.

References Cited by the Examiner

UNITED STATES PATENTS

| | | | |
|---|---|---|---|
| 1,437,224 | 11/1922 | Burns | 149—45 |
| 1,862,295 | 6/1932 | Burns | 149—45 X |
| 1,905,795 | 4/1933 | Burns | 149—45 X |
| 2,095,333 | 10/1937 | Hutchinson | 149—45 |
| 2,116,878 | 5/1938 | Brun et al. | 149—45 X |
| 2,160,469 | 5/1939 | Brun et al. | 149—45 |
| 2,175,826 | 10/1939 | Brun | 149—45 X |
| 2,239,547 | 4/1941 | Brun | 149—45 X |
| 2,327,867 | 8/1943 | Calhoun | 149—45 X |
| 2,377,670 | 6/1945 | Burdett et al. | 149—109 X |
| 2,662,818 | 12/1953 | Schuricht | 149—109 X |

CARL D. QUARFORTH, *Primary Examiner.*

BENJAMIN R. PADGETT, *Examiner.*

S. J. LECHERT, JR., *Assistant Examiner.*